United States Patent
Stroili et al.

(10) Patent No.: US 7,542,812 B2
(45) Date of Patent: Jun. 2, 2009

(54) MULTIFUNCTION RECEIVER-ON-CHIP FOR ELECTRONIC WARFARE APPLICATIONS

(75) Inventors: Frank D. Stroili, Hollis, NH (US); James M. Huggett, Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 182 days.

(21) Appl. No.: 10/543,343

(22) PCT Filed: Jan. 20, 2005

(86) PCT No.: PCT/US2005/001803

§ 371 (c)(1),
(2), (4) Date: Jul. 22, 2005

(87) PCT Pub. No.: WO2005/086631

PCT Pub. Date: Sep. 22, 2005

(65) Prior Publication Data
US 2006/0071845 A1  Apr. 6, 2006

Related U.S. Application Data
(60) Provisional application No. 60/537,867, filed on Jan. 20, 2004.

(51) Int. Cl.
*G01S 7/42* (2006.01)
(52) U.S. Cl. ............... 700/90; 342/13; 342/155
(58) Field of Classification Search .......... 700/29, 700/90, 302; 701/11; 257/728
See application file for complete search history.

(56) References Cited

U.S. PATENT DOCUMENTS

| | | | |
|---|---|---|---|
| 6,351,778 B1* | 2/2002 | Orton et al. | 719/310 |
| 7,142,882 B2* | 11/2006 | Schmidt | 455/552.1 |
| 7,236,431 B2* | 6/2007 | Morimoto et al. | 369/6 |
| 2003/0033522 A1* | 2/2003 | Bilgic et al. | 713/168 |
| 2007/0048715 A1* | 3/2007 | Miyamoto et al. | 434/308 |

OTHER PUBLICATIONS

Technologies for system on-a-chip.*
Chang et al., A single-chip W-band transcever with fornt -end Switching Receiver for FMCW Raar Applications, 1995, Electronic System and Technology Division, IEEE, pp. 225-228.*
Mark Rodwell, Interconnection within High Speed Digital System, 1999, University of California, IEEE workshop, pp. 1-52.*

* cited by examiner

*Primary Examiner*—Kidest Bahta
(74) *Attorney, Agent, or Firm*—Daniel J. Long; Robert K. Tendler

(57) ABSTRACT

What is provided is a receiver-on-a-chip comprising a monolithic integrated circuit that reduces the receiver to a cigarette-pack-sized assembly mountable directly at an antenna element, with a much-increased operational bandwidth and instantaneous bandwidth, increased dynamic range and with a two-order-of-magnitude decrease in size and weight. Moreover, because of the elimination of all of the I/O drivers and attendant circuitry, power consumption is reduced by two-thirds, whereas the mean time before failure is increased to 10,000 hours due to the robustness of the monolithic integrated circuit and use of fiber optics.

18 Claims, 15 Drawing Sheets

|  | Existing State-of-the Art EW Receiver | Future TEAM Based EW Receiver |
|---|---|---|
| Operating Frequency | 2GHz to 18GHz | 0.03GHz to 18GHz |
| Instantaneous Bandwidth | 500MHz | 2000MHz |
| Dynamic Range | 50dB | 60dB |
| Size | 200 Cu in | 7 Cu in |
| Weight | 10 lbs | 1 lb |
| MTBF | 1000 Hrs | 10,000 Hrs |

*Fig. 8*

MULTIFUNCTION RECEIVER-ON-CHIP FOR ELECTRONIC WARFARE APPLICATIONS

RELATED APPLICATIONS

This Application claims rights under 35 USC § 119(e) from U.S. Application Serial No. 60/537,867 filed Jan. 20, 2004, the contents of which are incorporated herein by reference.

STATEMENT OF GOVERNMENT INTEREST

The invention was made with United States Government support under Contract No. DAAB07-02-C-K513 awarded by the Army. The United States Government has certain rights in this invention.

FIELD OF THE INVENTION

This invention relates to receivers used in electronic warfare and more particularly to a miniaturized receiver-on-a-chip, placeable directly at an antenna element in which prior electronic warfare, EW, receiver modules are integrated monolithically into a single integrated circuit using ultra high-speed transistors.

BACKGROUND OF THE INVENTION

For many electronic warfare applications, phased array antennas are used for beam forming or direction finding purposes in which an aircraft, for instance, is provided with an antenna array, the outputs of the elements of which are coaxially cabled to an equipment bay on the aircraft where the signals are processed through a number of different receiver modules. These modules include low noise amplifiers, analog-to-digital converters, filters, mixers, IF stages, amplifiers and processors that constitute a centralized receiver system that is complex, heavy, consumes an excessive amount of power and is expensive.

In addition to weighing in excess of 60 pounds, the input/output (I/O) drivers of such a modular system can consume as much as 15 watts of power out of a 25-watt total, with the power drain primarily residing in the interfaces between the modules. This is because the interfaces must employ drivers that consume an excessive amount of power. Moreover, cabling between the modules and to antenna elements is heavy and leads to cable losses that result in power drain and decreased receiver sensitivity.

Power consumption and weight are indeed factors when one seeks to provide an unmanned aerial vehicle (UAV) such as the Predator with electronic warfare (EW) receiver capabilities. It will be appreciated that unmanned vehicles have limited fuel supplies, or if powered by solar cells, can only accommodate equipment having very limited power consumption. When the UAVs hover over an area sometimes for days, weeks or months, the longevity of the mission is critically dependent upon fuel consumption, which is in turn directly related to power consumption of the avionics package. Moreover, the ability to reduce the weight from the 60-pound modular system described above is critical because weight reduction translates to increased endurance. Size reduction is also a factor because present rack-mounted modular EW systems occupy too much space to be incorporated into the UAV avionics package.

It will thus be appreciated that in high-altitude, long-endurance UAVs the physical size of the avionics package is a problem. Not only does power consumption translate into endurance, but the ability to do the signal processing associated with the EW receivers must be done in packages that are to be located on a platform that is ten times smaller than, for instance the P3 reconnaissance aircraft.

In short, if one were to be able to completely eliminate the modules and the extensive coaxial cabling between modules, one could significantly reduce size, weight and power consumption, while at the same time reducing impedance mismatches that reduce sensitivity.

While one might be inclined to produce an EW receiver using multi-chip modules or MCM technology, it will be appreciated that the multi-chip module approach also consumes a significant amount of power. While the multi-chip module can shrink the size of the system to a certain extent, one must address the I/O interface power requirements, which as mentioned above can result in 15 watts wasted power out of the 25-watt total requirement. Thus, for instance, if one were to make a modular receiver system having, for instance, one module that includes an analog-to-digital converter and a demultiplexer, a second module that contains a low band pass filter, a high band converter, clock and local oscillator generation, a digital automatic gain control coupled to an analog-to-digital converter and another demultiplexer, all of which are coupled to a CMOS DSP processor, which is in turn coupled to a serializer, one would expend 5 watts of I/O power associated with the first analog-to-digital converter. This power consumption is added to a 2-watt current consumption for the I/O to the CMOS digital DSP. Next, there is a loss of 4 watts of power for the output due to the I/O associated with the demultiplexer that is associated with the low band and high band converters, with another 2 watts associated with the I/O to the CMOS DSP. Between the DSP and the serializer, there is another 2 watts of lost power due to the I/O drivers, with another 1 watt of lost power associated with the demultiplexer ahead of the serializer.

While power consumption of a modular receiver utilizing MCM technology is indeed a problem, there is also a requirement to improve on all of the characteristics of an MCM system to not only decrease power consumption for increasing endurance, but also to increase the dynamic range, provide improved instantaneous bandwidth, increase the operating frequency bandwidth beyond the usual 2 GHz to 18 GHz bandwidth, and increase the mean time before failure (MTFB). Note further that one needs to be able to decrease the equipment size from the present size of 200 cubic inches down to something considerably more manageable.

SUMMARY OF INVENTION

Rather than using either the MCM approach or any other modular approach, assuming for instance 5 modules, each six inches square, by using system-on-a-chip (SOC) architecture and the new IBM silicon-germanium transistor technology with switch speeds in excess of 100 GHz one can reduce the entire EW receiver to a package the size of 3 inches by 2 inches.

Moreover, since the interconnections between the various circuits that are monolithically formed on the chip are on the order of microns in length rather than wires of an inch or more, transmission line losses are eliminated along with the weight associated with the coaxial cable interconnects. Not only is the physical size reduced by an order of magnitude, but also because of the monolithic integrated approach, one completely eliminates the I/O buffers between the circuits, which significantly reduces the power consumption.

Even more significant is the fact that having achieved a receiver-on-a-chip package size of 2 inches by 3 inches, each receiver in and of itself can be placed adjacent an antenna element, with downstream communication being accomplished through fiber optic cables such that weight concerns, losses and impedance mismatches associated with coaxial cabling between the antenna elements and the processors are completely eliminated.

The ability to locate the EW receiver directly at the antenna element provides increased flexibility for the type of processing that can be achieved and greatly increases sensitivity by minimizing losses.

What makes possible the formation of such monolithic system-on-a-chip circuits is the advancement in semiconductor technology by IBM that involves new silicon-germanium techniques. Because of this new, faster technology the resulting transistor speeds and densities make the system-on-a-chip configurations possible.

For instance, recent IBM developments provide FTX-MAXes that relate to the toggling frequencies of the transistors well over 100 GHz, as opposed to the present state-of-the-art FTX-MAXes of 20 to 30 GHz. What this means is that there is an order of 3 to 4 times improvement in the switch speed, which translates into improved analog-to-digital converters that do not require as much down-conversion as was heretofore thought required.

The result of being able to run the analog-to-digital converters at much higher rates increases the overall receiver bandwidth from the original 2 GHz-to-18 GHz to 0.03 GHz-to-18 GHz. Moreover, the instantaneous bandwidth goes from 500 MHz to 2000 MHz, with the dynamic range being improved from 50 dB to 60 dB. The size when compared to the 200 cubic inches for the modular units goes down to 7 cubic inches, whereas a weight of ten pounds for MCM EW receivers goes down to 1 pound. Moreover, the Mean Time Before Failure increases from 1,000 hours to 10,000 hours.

The overall impact of the use of a silicon-germanium system-on-a-chip approach reduces the number of multiple IF down-conversion stages and not only eliminates the requirement of a separate RAIU plus a separate RF unit, but also permits moving the analog-to-digital converter after the second local oscillator to the front end of the system. What this means is that there is a parts count reduction due to the ability to eliminate two local oscillators and the associated down-conversions, simply by being able to design a super-high-speed analog-to-digital converter. Also gone are the drivers between modules and the attendant power consumption.

Importantly, the heavy coaxial cables used to interconnect the modules and, indeed, to connect the equipment bay to the phased array antenna elements are completely eliminated. Because the receiver has now been reduced to a size that can be conveniently placed at each of the antenna elements, no coaxial cabling is required with its attendant losses and weight. The result is that one can do whatever signal processing is necessary directly at each of the antenna elements and connect the digital receiver outputs by fiber optic cables that are in essence lossless devices.

One therefore has gone from a centralized receiver system that is complex, heavy, power-consumptive and expensive to a much lower cost, more flexible system that can be placed at each antenna element. The result is that such a system can be easily deployed on UAVs and, for instance, can be used on ground sensors that need to be low power and very small because they are battery powered and must last for long periods of time after deployment.

Gone also are the high-speed interfaces, which are power-consumptive, with the subject receiver-on-a-chip completely re-capturing the 15 watts lost in multiple module systems. Thus, the subject system is uniquely applicable to high altitude long endurance UAVs, which may have to circle and loiter for weeks or months while performing persistent ISR or intelligence surveillance and reconnaissance.

As will be appreciated, when one goes from a 60-pound equipment bay payload down to 1 pound, endurance is optimized.

Moreover, the subject system achieves added flexibility since each antenna element can now be provided with its own receiver and its own tuner. One can therefore do much more flexible digital beam forming with the multi-function operation achievable by the subject receiver-on-a-chip. As a result, anything that had required analog signals can now be put efficiently digitized and put together into a single receiver channel. Moreover, since one does not have to deal with the losses associated with cabling, one achieves better receiver sensitivity.

It has been found that one can achieve an 11 dB increase in sensitivity by eliminating the coaxial cabling. And one can also achieve a bandwidth increase below 2 GHz. As mentioned above, because of the higher-speed analog-to-digital converter capability afforded by the new silicon-germanium technology, one can have a 10 GHz-per-second analog-to-digital converter as compared with the present 2 GHz analog-to-digital converters. The increased speed of the analog-to-digital converters directly translates to increased bandwidth and reduces the number of IF stages.

In summary, what is provided is a receiver-on-a-chip comprising a monolithic integrated circuit that reduces the receiver to a cigarette-pack-sized assembly mountable directly at an antenna element, with a much-increased operational bandwidth and instantaneous bandwidth, increased dynamic range and with a two-order-of-magnitude decrease in size and weight. Moreover, because of the elimination of all of the I/O drivers and attendant circuitry, power consumption is reduced by two-thirds, whereas the mean time before failure is increased to 10,000 hours due to the robustness of the monolithic integrated circuit and use of fiber optics.

BRIEF DESCRIPTION OF THE DRAWINGS

These and other features of the subject invention will be better understood in connection with a Detailed Description, in conjunction with the Drawings, of which:

FIG. 8 is a table listing the differences between a state-of-the-art multi-chip module EW receiver and the subject receiver-on-a-chip, showing improvements in operating frequency, instantaneous bandwidth, dynamic range, size, weight and mean time before failure;

DETAILED DESCRIPTION

Figure 1:
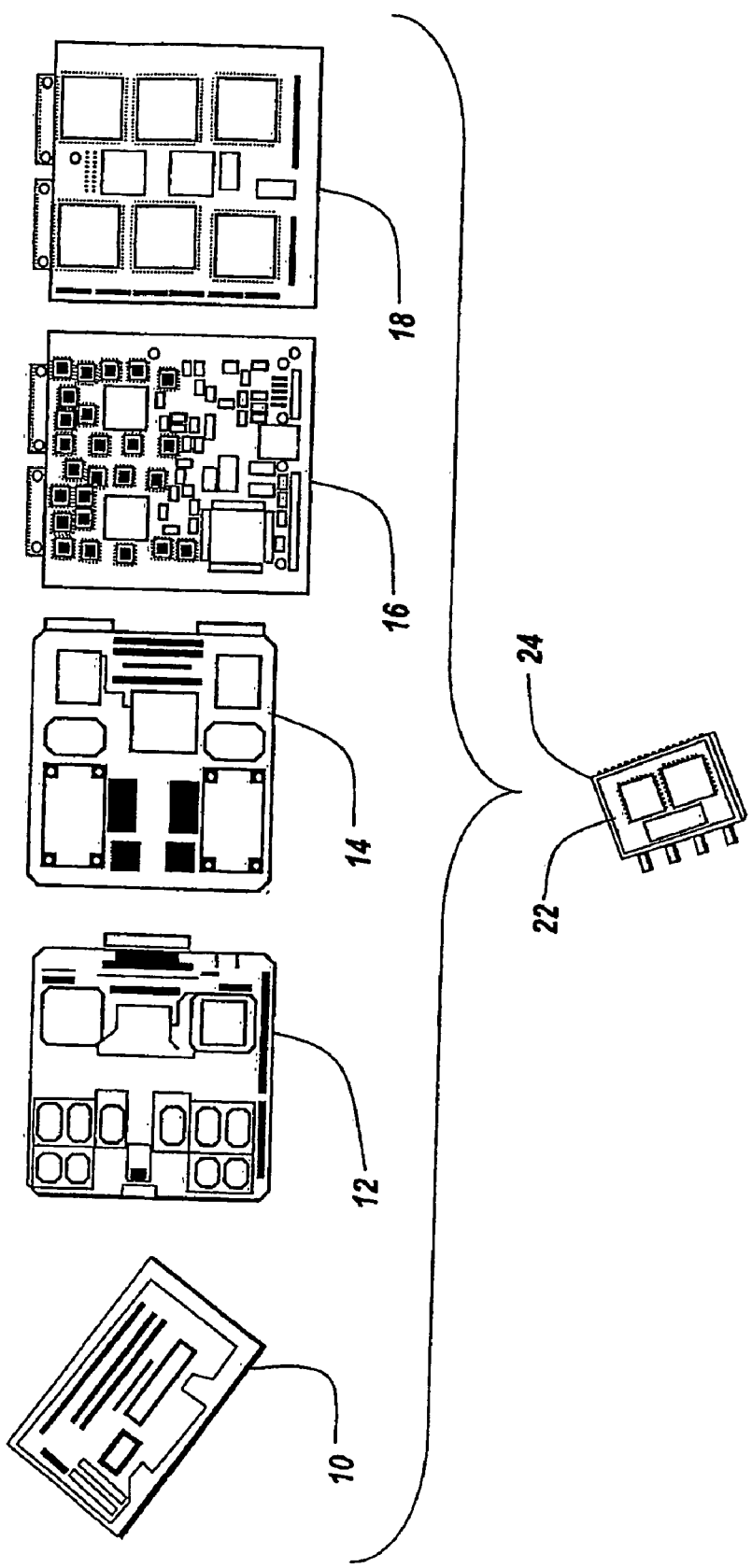
FIG. 1 is a diagrammatic illustration of the reduction in size for a modular EW receiver having a number of individual modules to a monolithic integrated circuit receiver having dimensions of 3" by 2", which can be located directly at an antenna element embedded in the wing of a fighter aircraft.

Referring to FIG. 1, current modular digital EW receivers have a number of modules 10, 12, 14, 16 and 18, respectively an RF converter module, a module for the first half of an IF conversion section, a second module of an IF conversion section, an RF digitizer module, and an RF digital processing module. These modules are cabled together in an electronics suite within an aircraft so as to provide the requisite digital receiver functions for surveillance, intelligence gathering and oftentimes for direction finding and fire control. Typically, each of these modules is 6 inches on a side so as to comprise at least 30 inches of rack space within the electronics suite of the aircraft.

As mentioned hereinbefore, these modules are usually interconnected by coaxial cables as well as being connected by coaxial cable to various antenna elements in the antenna array, usually embedded in the wing 20 of an aircraft 21.

As mentioned hereinbefore, the weight, power consumption, losses and mean time before failure problems need to be resolved, not only to improve bandwidth and lower power consumption and weight, but also to provide a package that is easily installed in a much smaller aircraft such as a UAV. As can be seen by the picture of receiver 22, it is possible to reduce all of modules 10-16 to a single monolithic chip and to provide the chip in a housing that in one embodiment is only 3 inches by 2 inches. In so doing, there is a total volume reduction of greater than an order of magnitude, which offers significant performance improvement and enables insertion on high-endurance UAVs.

Figure 2:
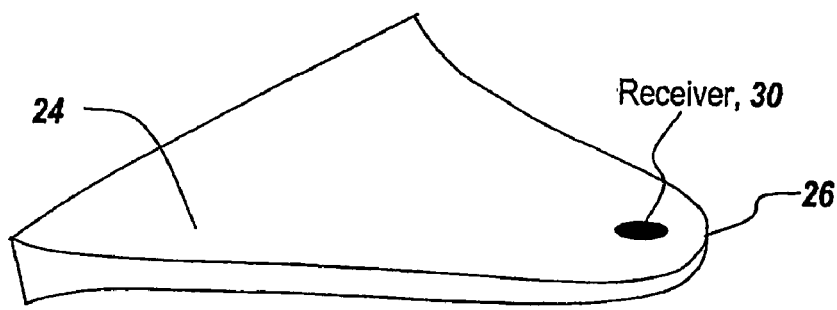
FIG. 2 is a diagrammatic illustration of the placement of the subject monolithic integrated circuit receiver at one of the phased array elements of an antenna carried by an aircraft, showing an 11 dB increase in sensitivity from reduced cable loss.

As illustrated in FIG. 2, a wing 24 of an aircraft is provided with a phased antenna array, in this case located at wingtip 26, which includes, for each element of the phased array, a receiver that is of such small size that it can be co-located with the antenna element. One of the important features of the subject invention is that by making the EW receiver so small and co-locating it with an antenna element, one can achieve an 11 dB increase in sensitivity because, as will be described hereinafter, any communication that is necessary between the receivers is accomplished through fiber optic cables, which offer a 40 Gb/s serial link.

The combination of the receiver adjacent each element allows side lobe and back lobe electronic warfare and electronic intelligence capabilities, while at the same time resulting in dramatic reductions in size, weight and recurring cost.

Figure 3:
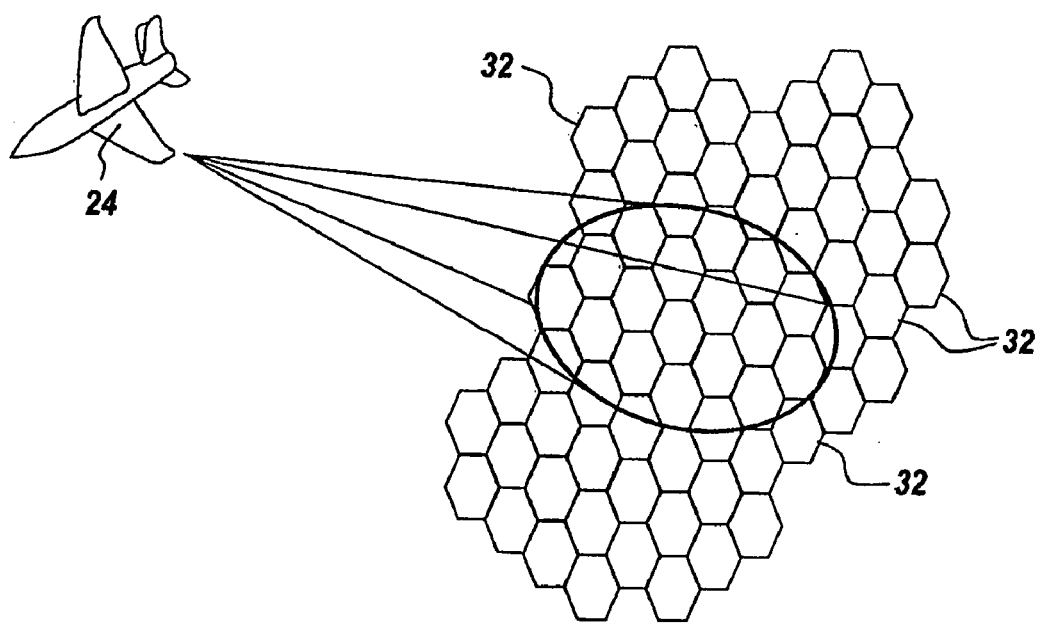
FIG. 3 is a diagrammatic illustration of the formation of a multi-beam, multi-function element level digital beam former array capable of being embedded in the wing of the aircraft of FIG. 2.

Referring to FIG. 3, diagrammatically, the array of antennas embedded in wing 24 in one embodiment includes a number of antenna elements 32 mounted to wing 24, which enables multi-beam, multi-function element level digital beam forming for the array, thus to remove operational constraints and increases the degrees of freedom, while enabling hyper concurrent and cross-mission operation.

Figure 4:
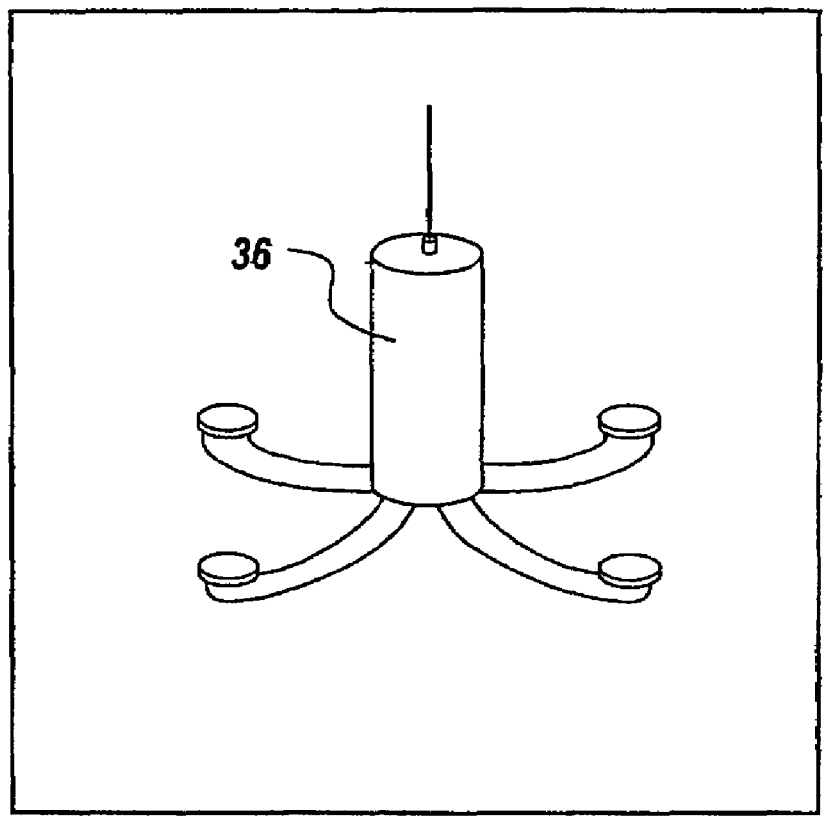
FIG. 4 is a diagrammatic illustration of the use of the subject receiver in an expendable, intelligent, high-performance sensor, which is deployable by air and which is battery powered, with the subject receiver-on-a-chip responsible for increased endurance.

Referring to FIG. 4, such miniaturized EW receivers have use not only in airborne applications but also in battery-operated ground sensors such as illustrated at 36, which are deployable by air dropping or physical placement, and which include communications equipment that must stay on station for days, months or years and not run down the on-board batteries. Even if the sensors are provided with solar cells, the amount of current draw must be minimized and the supplying of the subject receiver-on-a-chip, with its high speed silicon-geranium technology, provides the deployable sensors with affordable receivers that can be used, for instance, for ground surveillance and situational awareness, or can be used for communication relays and to deploy electronic attack.

Figure 5:
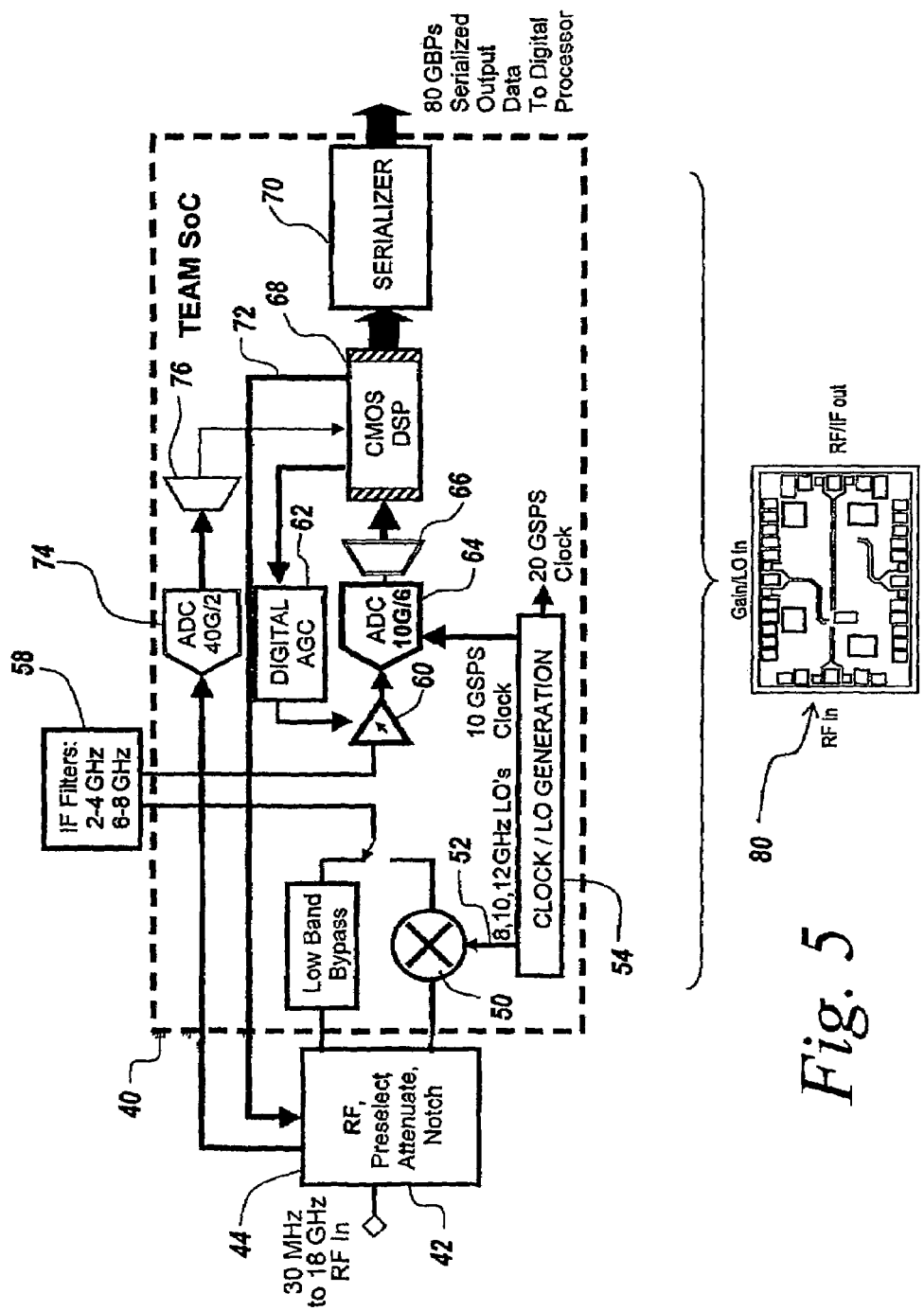
FIG. 5 is a block diagram of the subject receiver-on-a-chip, illustrating that the entire circuit can be provided as a single monolithically formed silicon-germanium integrated circuit.

Referring now to FIG. 5, the subject receiver-on-a-chip 40 employs a silicon-germanium technology that not only reduces the parts count over a modular system but also results in increased bandwidth and other of the advantages noted above.

The feed for the subject receiver-on-a-chip is a 30 MHz to 18 GHz RF input 42, which is coupled to an RF pre-select and attenuation or notch filter circuit 44, which is off-chip. The output of this circuit is amplified by a low noise amplifier LNA 46 and is either switched between a low band pass filter 48 or a mixer 50 is used in a single down-conversion stage, with the mixer being driven by either 8, 10 or 12 GHz local oscillators on line 52 from a clock and/or local oscillator 54. Either the low pass filtered output of LNA 46 or the down-converted output of a mixer 50 is supplied by a switching circuit 56 to an off-chip IF filter bank 58, which provides IF filtering either for the 2-4 GHz band or the 6-8 GHz band. What will be seen is that either there is no down-conversion or there is only a single step of down-conversion. This operation is made possible due to the high frequencies at which the analog-to-digital converters can be run due to the silicon-germanium IBM technology. The output of the IF filter bank is applied to a variable-gain amplifier VGA 60 under the control of a digital automatic gain control circuit 62, which as will be seen can be identical to mixer 50. This minimizes the number of different circuits that need to be fabricated.

Thus, as an offshoot of the subject invention, it will be appreciated that the same section of the monolithic circuit used for the mixer can be used without alteration as both an RF down-converter using IBM SiGe 7HP technology or a variable-gain amplifier, also using this same technology. In the down-conversion mode, the RF down-converter has a measured gain of 6.7 dB, with an 11.2 dB noise figure (NF) and a 2 GHz bandwidth.

As a variable-gain amplifier, the same technology has a bandwidth from DC to 10 GHz, with a −24 to 14.5-dB gain and a 54-dB spur-free dynamic range (SFDR).

It will be noted that the low noise amplifier 46 likewise utilizes IBM SiGe 7HP technology, with a measured 21 GHz bandwidth and a 4.6 to 5.8-dB NF.

It is noted that the output of the variable-gain amplifier 60 is applied to an analog-to-digital converter 64, which has as one of its inputs a 10 Gsps clock. The output of the analog-to-digital converter is applied to a demultiplexer 66 and thence to a CMOS digital signal processor DSP 68, which has standard interfaces to enable efficient application development. One output of the CMOS DSP 68 controls the digital-analog gain control circuit 62 over line 70, whereas a signal over line 72 controls the RF pre-select/attenuate/notch circuit 44.

As illustrated, the output of the CMOS DSP 68 is applied to a serializer 70, the output of which is 80 GPBS serialized output data, which can be transmitted over a fiber optic link to a digital processor.

Note that analog-to-digital converter 64, the CMOS DSP 68 and the serializer can be implemented by an analog-to-digital converter (ADC) serializer using IBM SiGe 7 HP technology, with a 10 Gsps 4-bit capability, a 50-dB Spurious Free Dynamic Range (SFDR), with the serializer being a 40 Gbps serializer.

Note that an analog-to-digital converter 74 is coupled to the RF, pre-select, attenuate and notch unit 44, which is used to detect interference over a full spectrum and provides a steerable notch filter function. This analog-to-digital converter is implemented in one embodiment with a silicon-germanium 8HP technology and has a 20 Gsps 3-bit characteristic with a 26-dB SFDR. Note that the output of this analog-to-digital converter is demultiplexed at 76 and is applied to the CMOS DSP 68.

What will be appreciated is that the silicon-germanium high-speed technology is used in all components, namely the LNA, the low noise amplifier, the RF down-converter, the variable-gain amplifier, both analog-to-digital converters, and for the serializer, with the CMOS DSP being the only element that employs CMOS technology.

As illustrated by reference character 80, the entire monolithically formed receiver-on-a-chip circuit may take the miniaturized form shown, which results in an IBM silicon-germanium 8HP unit, with 10 Gsps at 6 bits, a 60-dB SFDR, and can accommodate a CMOS DSP application having up to 1000 gates, with a 40 GPS serializer being used to provide a data output to any follow-on digital processors that may be used in the RW application.

Figure 6:
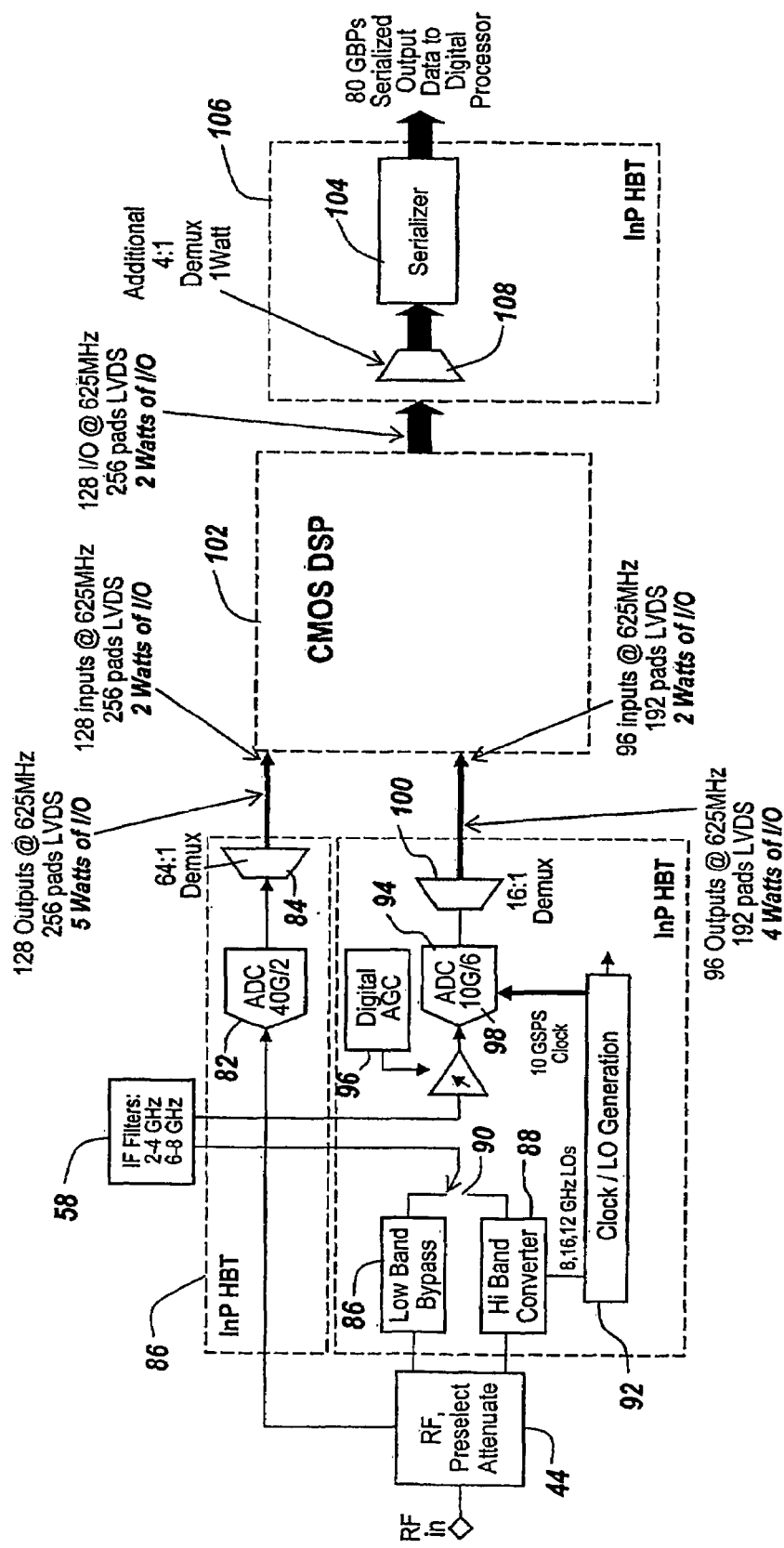
FIG. 6 is a block diagram of a prior art broadband EW receiver system, indicating that the individual multi-chip modules that together constitute the receiver are provided with drivers for interfacing the modules, the use of which results in excessive power drain.

The single-chip receiver solution depicted in FIG. 5 completely supplants an MCM embodiment of an EW receiver that, as discussed, does not satisfy the need for high integration levels. In the subject system, and referring to FIG. 6, the same RF pre-select/attenuation/notch unit 44 feeds an indium phosphide heterojunction bipolar transistor HBT analog-to-digital converter 82 coupled to a 64:1 demultiplexer 84 as illustrated. These two units correspond to a module 86 as illustrated.

The outputs of unit 44 are likewise supplied to a low band pass unit 86 and a high band converter 88, the outputs of which are switched at 90 to the aforementioned IF filter bank 58, with the high band converter being provided with a clock and local oscillator generator 92 having an output coupled to an analog-to-digital converter 94, with a digital automatic gain control 96 coupled to a variable-gain amplifier 98. The output of analog-to-digital converter 94 is coupled to a 16:1 demultiplexing unit 100.

The demultiplexing units 84 and 100 provide respectively 128 outputs at 625 MHz, with 256 pads of LVDS, but with a current draw of 5 watts for the I/O that this driver represents.

For demultiplexer 100, there are 96 outputs at 625 MHz, with 192 pads LVDS but with a current draw of 4 watts of I/O, such that the combined current draw for these two demultiplexers is 7 watts. The I/O for a CMOS DSP 102 to which these two demultiplexers are coupled involves an interface for demultiplexer 84 having 128 inputs at 625 MHz, 256 pads LVDS, which has an associated current draw of 2 watts of I/O. On the other hand, the output from demultiplexer 100, when interfaced to CMOS DSP 102, having 96 inputs at 625 MHz and 192 pads LVDS, has an associated current draw of 2 watts. At this point, one has expended 13 watts in the I/O process due to the drivers and demultiplexers associated with the interfacing of the modules.

The output of the CMOS DSP is applied to a serializer 104 in a module 106 that includes an additional demultiplexer 108. It is noted that the CMOS DSP output has a 128 I/O at 625 MHz, with 256 pads LVDS and has a current drain of 2 watts of I/O, bringing the total current draw of this modular system up to 15 watts. Note that the internal demultiplexer 108 in module 106, which offers a 14:1 demultiplex capability draws 1 watt, which in either the subject single-chip receiver-on-a-chip or the MCM version thereof, is necessary.

What can be seen from the MCM version described above is that, due to the interfacing of the various modules of the MCM receiver, one wastes approximately 15 watts of the total 25-watt power consumption, which wasted power is recouped by using the subject single-chip receiver.

Figure 7:
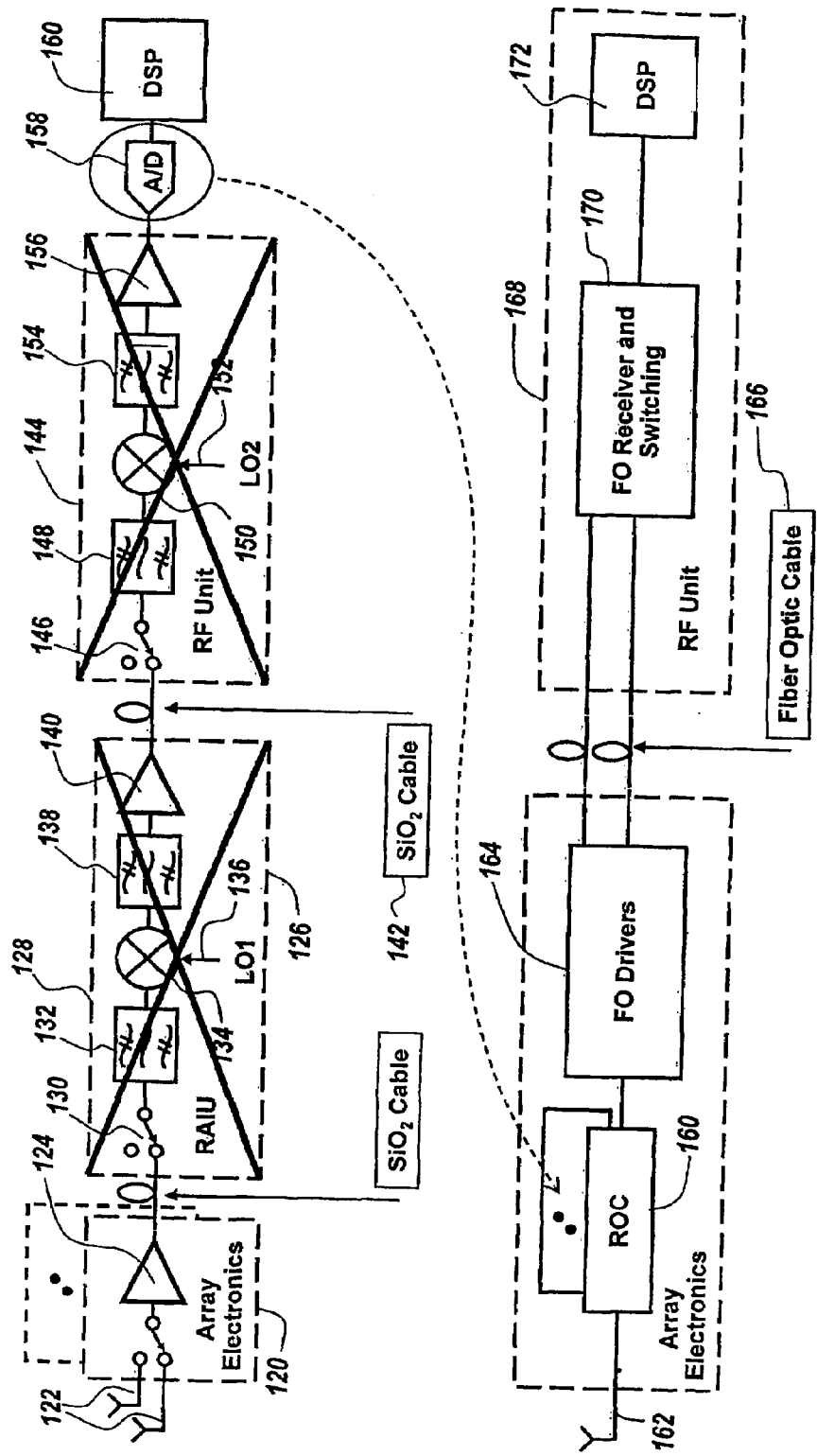
FIG. 7 is a block diagram illustrating the reduction in parts count associated with taking a multi-chip EW receiver, in which the single integrated circuit receiver permits eliminating 2 IF stages and uses the analog-to-digital converter at the head end of the subject system.

Referring to FIG. 7, the difference between the standard modular approach and the subject system is readily apparent.

In the prior art, electronics array 120 is serially coupled to antenna elements 122 to drive a low noise amplifier 124 through a silicon oxide cable 126 coupled to a RAIU 128, which is switched to the output of the cable via switching circuit 130. The output of switch 130 is filtered at 132 and is applied to a down-conversion mixer 134 supplied with the output of a first local oscillator 136. The down-converted output is filtered at 138 and is amplified at 140, whereupon it is applied via a cable 142 to a second stage down-converter 144. This down-converter has its own switching circuit 146 coupled to a filter 148 and to a mixer 150 that serves as a down-converter, with the mixer being supplied with a second local oscillator signal over line 152. The output of the mixer is applied to a filter 154 and thence to an amplifier 156, the output of which is applied to an analog-to-digital converter 158 coupled thence to a DSP 160.

Rather than using the two stages of down-conversion associated with the MCM version of the EW receiver and due to the availability of higher speed analog-to-digital converters, analog-to-digital converter 158 with improved technology is used in the single-chip receiver-on-a-chip IC 160 version of an EW receiver. Each IC 160 is coupled to its own individual antenna element 162, the outputs of which are supplied to fiber optic drivers 164, which drive fiber optic cables 166. These fiber optic cables are provided to an RF unit 168, which has a fiber optic receiver and switching unit 170, the output of which is applied to a digital signal processor 172.

What will be seen in this comparison is that a large number of individual modules associated with prior art EW receivers can be eliminated along with cabling between the modules due to the use of super high-speed silicon-germanium architectures, which results in the advantages listed in the Table of FIG. 8.

Referring now to FIG. 8, it can be seen that the operating frequency is extended down to 0.3 GHz, whereas the instantaneous bandwidth goes from 800 MHz to 2,000 MHz, with the dynamic range increased from 50 dB to 60 dB. Most importantly, the size is reduced from 200 cubic inches to 7 cubic inches, with a rate reduction over the MCM version of ten pounds to one pound and an MTFB going from 1,000 hours to 10,000 hours.

More specifically, the present invention uses IBM's latest 7HP and 8HP SiGe HBT foundry process in which an A/D converter (4 bits@10 GHz) is used which is monolithically integrated with a 40 GB/s serial link. Other building blocks are also developed including a variable gain amplifier and an LNA.

I. Architecture.

The frequency plan uses dual IF frequencies of 2-4 GHz and 6-8 GHz. Those IF frequencies map into the first and second Nyquist bands of the ADC operating at 10 Gsps. These bands correspond to 2 of the RF frequency bands that are needed, so those bands can be direct-sampled with maximum spur-free dynamic range. For other frequency bands, the dual IF frequencies allows us to use 1 LO Frequency to get two RF bands, simply by selecting the appropriate IF aliasband frequency. This reduces the number of VCO frequencies that will be required to obtain complete band coverage. The single-conversion also minimizes the design complexity associated with off-chip interfaces that are needed for double-conversion.

SiGe technology provides a revolutionary benefit in wideband systems, as it enables large amount of digital processing to be done on-chip, without the latency and power dissipation that is incurred in traditional multi chip system implementations.

II. Components

1. Low Noise Amplifier

The wideband amplifier is implemented using a distributed amplifier topology, which offers high gain, wide bandwidth, and low noise figure. Each stage of the distributed amplifier is implemented as common-emitter-common-base amplifier. For all the stages of distributed amplifier, an emitter degeneration resistor is included to reduce the low frequency gain. A shunt capacitor is attached to the emitter to eliminate the gain reduction due to the degeneration resistors at high frequency.

Figure 9:
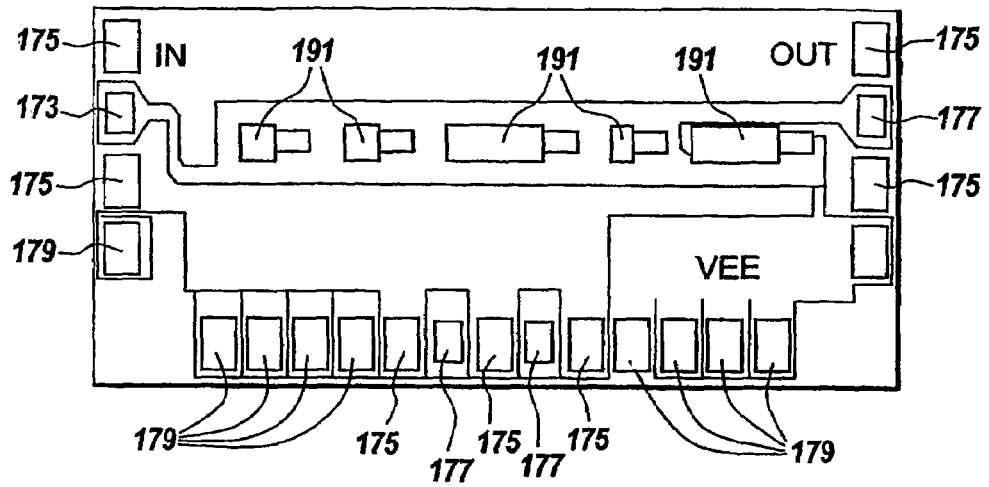
FIG. 9 is a top plan photograph of a fabricated 2 to 18 Hz LNA of the present invention.

Referring now to FIG. 9, what is shown is a photograph of the fabricated LNA chip. Connection 173 is a single-ended input referenced to multiple ground connections 175. Five amplifier gain stages 181 amplify the signal coupled off of the input and sum their respective outputs together in a spatially distributed fashion. The output is then sent off of the chip at the single-ended port 177, which is also referenced to the ground connections 175. The remaining connections 179 are connected together on-chip and externally connected to the voltage bias supply, $V_{EE}$.

Figure 10:
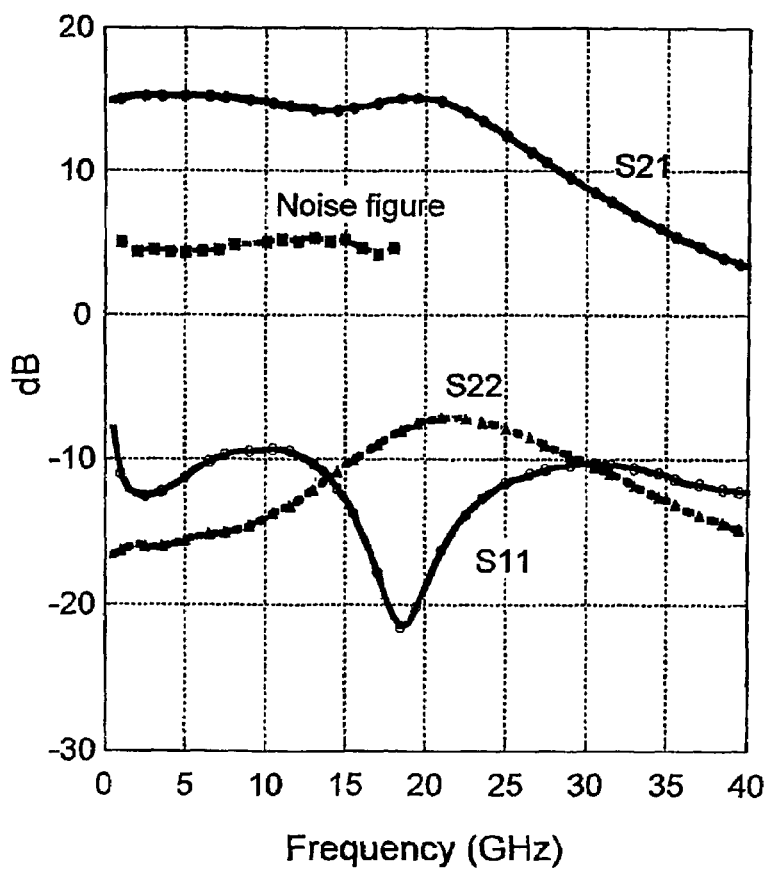
FIG. 10 is a graph showing measured LNA 5-parameters and noise figure.

DC biasing current and the number of stages in the LNA significantly affects the gain and noise performances. An increase in number of stages and biasing current will increase both gain and noise figure, and vice versa. The optimum number of stages and single stage collector biasing current is found to be five stages and 4 mA respectively. High frequency measurement of the LNA is carried out using on-wafer short, open, load and thru (SOLT) calibration with an HP8510C vector network analyzer. The noise figure of the LNA is measured from 1 to 18 GHz using an HP 8971C noise figure meter, an ATN tuner and noise measurement software. The S-parameter and noise figure measurement results are shown in FIG. 10. The 2-18 GHz LNA has a 15 dB gain, 5 dB noise figure, and VSWR better than 2.5:1 at both input and output ports. Two-tone third order intercept point is also measured using a microwave source sweeper at 18.0 GHz with 1 MHz frequency spacing. The measurement showed that the wideband LNA has an OIP3 of 15.5 dBm. In the next phase the noise figure is improved to 3 dB using the 8 HP process.

2. Variable Gain Amplifier/Mixer

The primary application of the VGA is automatic gain control in the IF path. But the high linearity, wide range in gain control, and broad bandwidth also lends this circuit well to analog multipliers, down-converters, and up-converters.

Silicon germanium (SiGe) technology offers considerable advantages over other semiconductor technologies in this VGA application. SiGe HBTs have 2-3× greater Ft than CMOS, enabling higher frequency, broader bandwidth circuits. When using the IBM 8HP technology, the bipolar transistor devices will exhibit Ft's of 220 GHz, while a leading 0.13 um RF-CMOS process has an Ft of only 80 GHz. SiGe does not offer any noise figure advantages in LNA designs, but the high Ft allows large improvements in bandwidth.

The 1/f noise in SiGe HBT devices is considerably lower than CMOS. This allows much lower phase noise VCOs which can be used for on chip clock sources for A/D converters. The IBM7HP 1/f corner is <1 kHz, while CMOS devices exhibit 1/f corners greater than 1 MHz.

Figure 11:
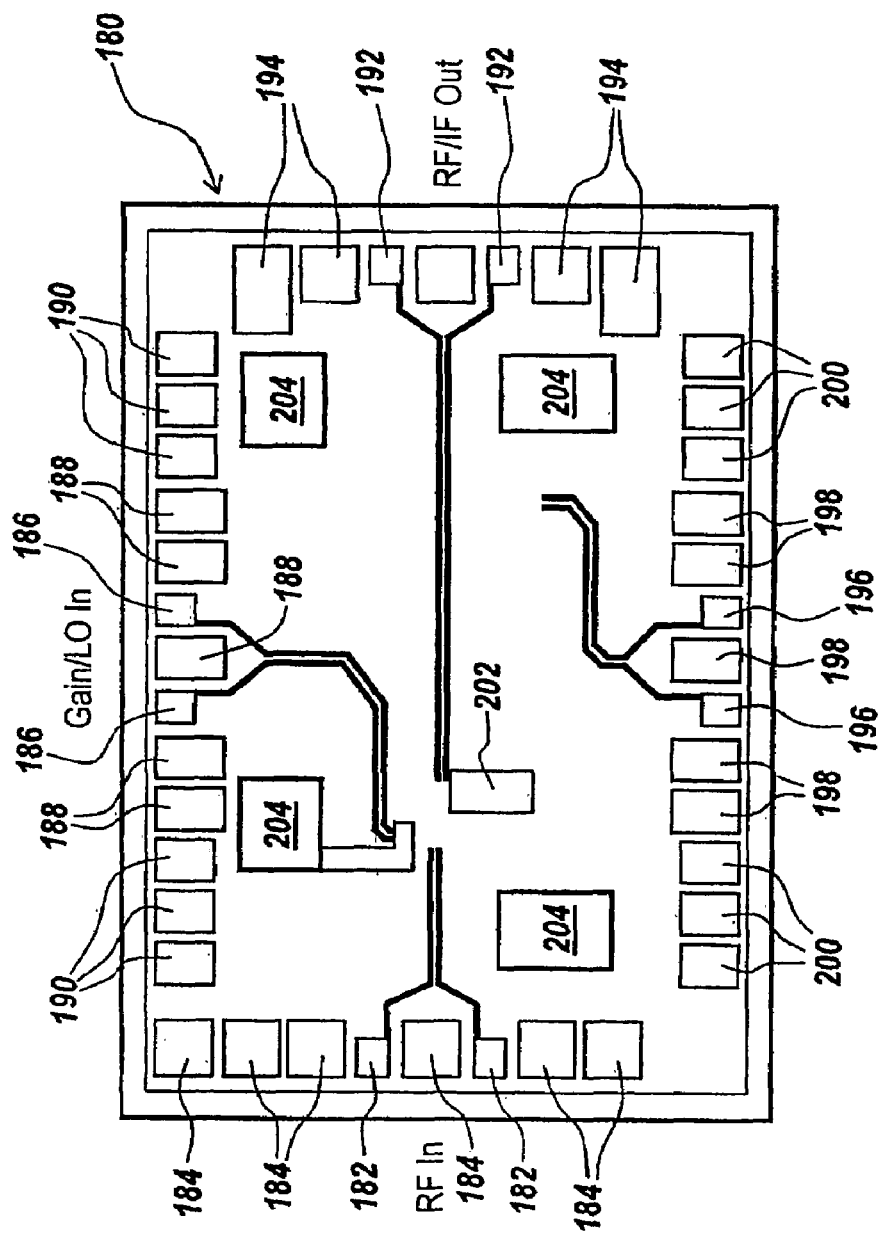
FIG. 11 is a top plan micrograph of a variable gain amplifier of the present invention.
Figure 12:
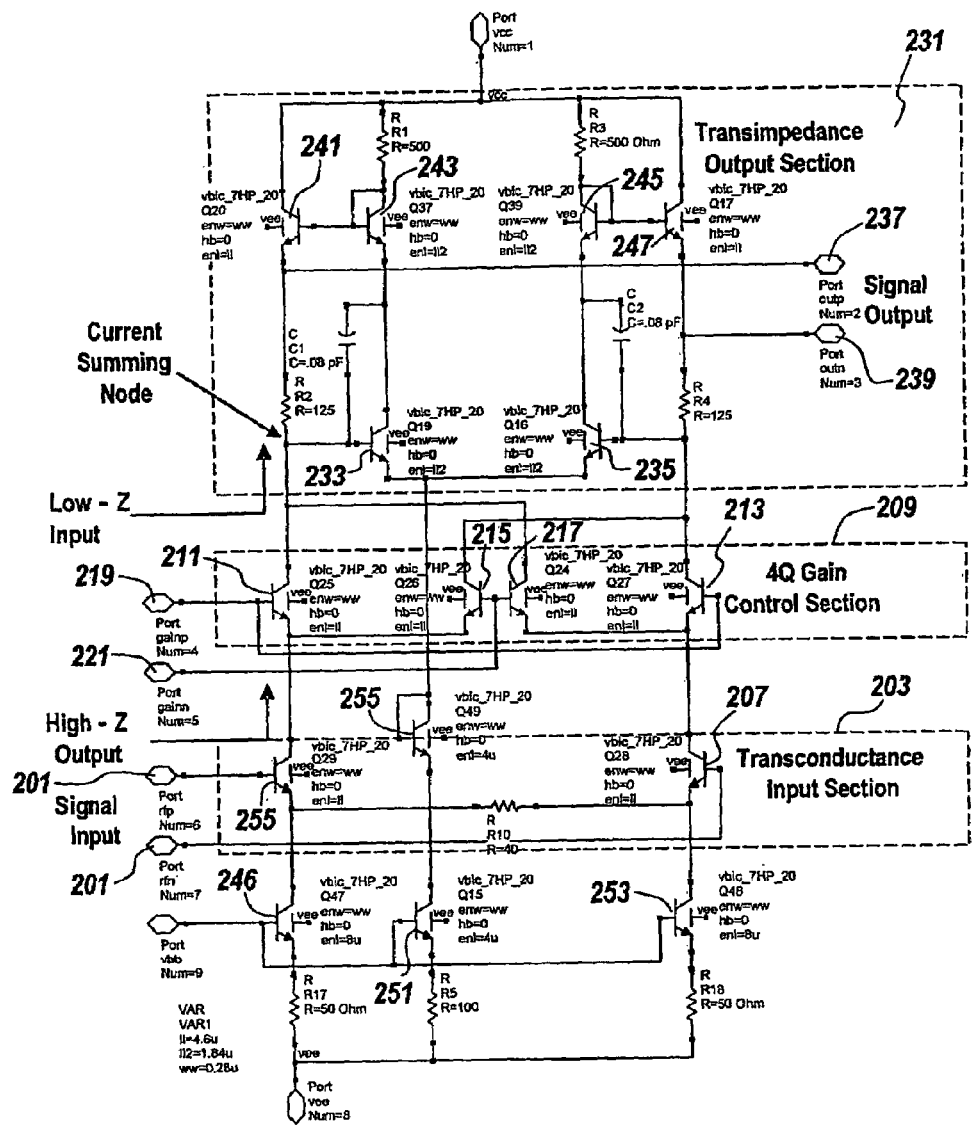
FIG. 12 is a schematic diagram of the core of the variable gain amplifier of the present invention.

The VGA is based on a Gilbert cell topology utilizing a Cherry-Hooper bandwidth enhancement technique. Feedback and emitter degeneration are used to enhance linearity. FIG. 11 shows the micrograph of the IC and FIG. 12 shows a simplified schematic of the VGA core.

Referring now to FIG. 11, it will be appreciated that the VGA core 180 is in essence a circuit to allow one to create and measure the interface parameters for the individual parts of the overall system one is creating. By being able to measure the individual parts, one can then adjust how the interfaces go together when one assembles the larger circuit.

VGA core 180 has a number of connection points that are in the form of connectors. At the left-hand side of the circuit are RF-in connection points 182, which are surrounded by ground connectors 184. The RF-in connection points are surrounded by a number of grounds to enhance the isolation of signals between the input-output and LO or gain controls.

The gain/LO-in connectors are illustrated at 186. These connectors are similarly surrounded by grounds 188. Note that there are a number of spare connectors 190 that surround gain/LO inputs 186.

As illustrated at the right-hand side of the circuit, connectors 192 correspond to the RF/IF-out signal connections, again similarly surrounded by ground connectors 194.

At the bottom of this circuit are power connectors 196, attendant grounds 198 and spares 200. Note that the actual active circuit is illustrated at 202, with the other elements 204 being power conditioning circuits.

Referring now to FIG. 12, the circuit diagram corresponding to circuit 180 of FIG. 11 assumes that it has a signal input corresponding to inputs 182 of FIG. 11, here illustrated at 201. These inputs go to the bases of the transistors of a transconduction input section 203 that includes NPN transistors 205 and 207. Here the input signals are applied to the bases of these transistors. This transconduction input section converts a voltage to a high-impedance current output, which is applied to a four-quadrant gain control section 209 and more particularly to the emitters of transistors 211 and 213, as well as to the emitters of back-to-back transistors 215 and 217.

The gain/LO inputs at 186 are control signals that are applied at 219 and 221 to respective bases of transistors 211, 213, 215 and 217. This section creates a current-steering function that steers the differential current coming from the transconductance section as a function of the voltage input on the inputs 219 and 221. That differential current is then applied to a transimpedance output section 231 and more particularly to the bases of NPN transistors 233 and 235. These two transistors form the transimpedance function of this circuit, which converts the current output from the gain control section that is at a high impedance, into a low-impedance input that drives the voltage output at terminals 237 and 239.

The top and bottom of the FIG. 12 circuit act as current generation sources for biasing the various impedance and gain-control sections of the rest of the circuit. The circuit elements for these biasing circuits include transistors 241, 243, 245, 247, 249, 251 and 253, along with transistor 255. In short, the aforementioned circuitry generates the current that biases the circuit.

In operation, the voltage input signal is applied to differential input ports P1 and P2. The gain control section multiplies the input signal by the gain voltage on differential ports P3 and P4. The signal passing through the gain control section is a current signal with minimal voltage swing. This reduces the impact of parasitic capacitances and maximizes bandwidth. The current signal is converted back to voltage in the upper transimpedance section. The low input impedance ensures small voltage swings. This technique of impedance mismatching, where a low input impedance is driven by a high output impedance current source enhances bandwidth.

For testing the 1.28×2.00 mm chip was bonded to an alumina substrate. DC power and control signals were wire bonded to the chip, while the high-speed ports used 40 GHz probe heads. External baluns where used to interface the single-ended test equipment signals to the differential ports of the VGA.

The VGA was also tested as a down-converting mixer. Even though this SoC building block was not optimized for this purpose, it performed very well with a 26 GHz RF signal, 19 GHz LO signal, with a 7 GHz IF output. Note, the VGA presented here represents the baseline for the mixer cell.

Figure 13:
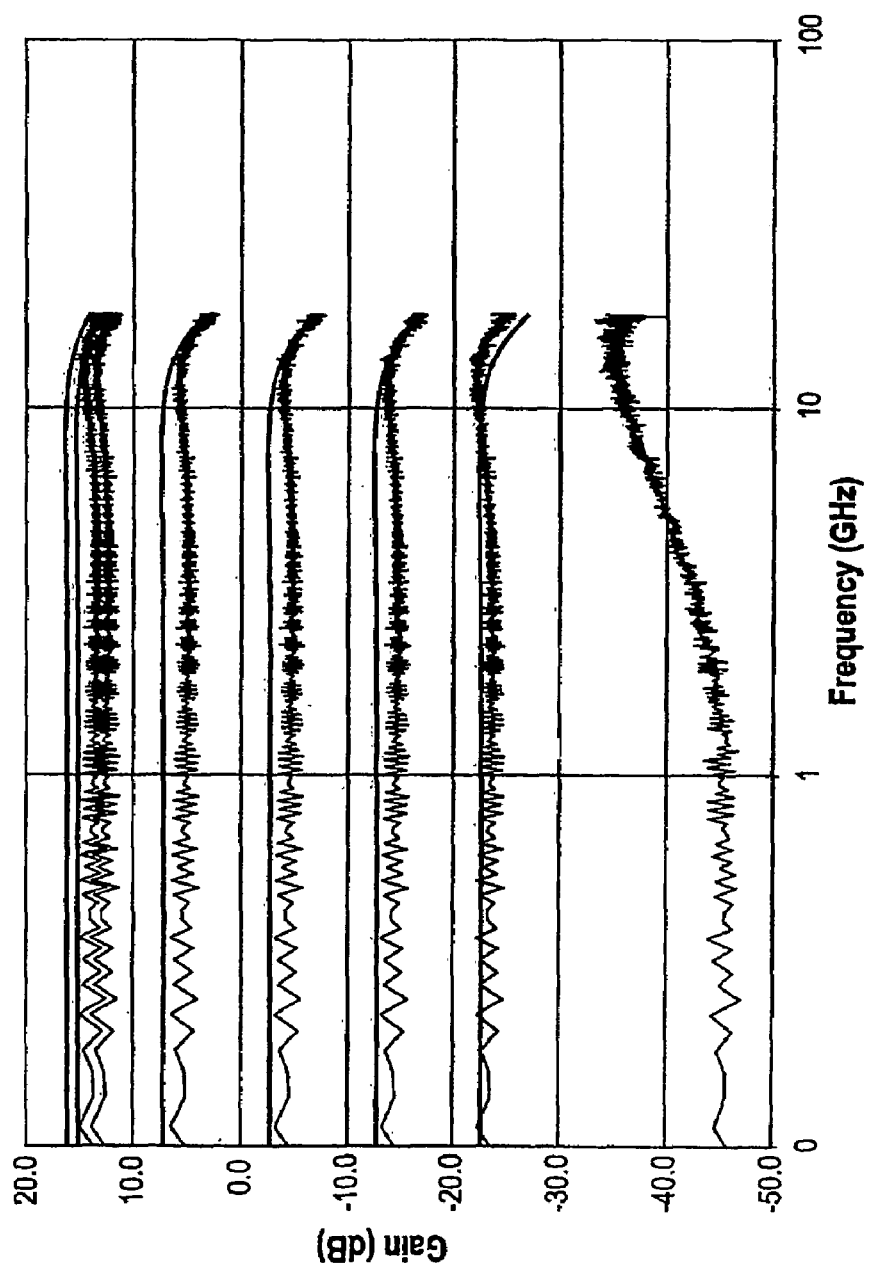
FIG. 13 is a graph showing measured UGA power curves.

A family of gain vs. frequency curve measurements is given in FIG. 13. This measurement was performed by wafer probing the chip on a substrate. The smooth red lines are simulation result, while the different colored lines are 10 dB gain steps. Note that the gain is very flat at any gain setting, a highly desirable feature of a VGA. The gain also changes in 10 dB steps with 10 dB commanded gain steps. There are a couple of slight deviations from simulation however.

2. A/D Converter and Serializer

One of the key issues in a high speed ADC is the problem of transferring large amounts of generated digital data from the ADC to the processing unit. In many applications ADC and the processing unit are not co-located. Transferring many lines of data in parallel is costly, unreliable, and prone to noise and electrical crosstalk. In the subject invention a novel approach is taken by using the existing fiber optic transceiver technology to multiplex the digital data into a higher rate stream and transferring it via a single fiber link. The main components of this chip are a 10 Gsps ADC and a 40 Gbps serializer. Additional blocks such as digitally-generated dither are included on the chip to boost the performance of the ADC.

Figure 14:
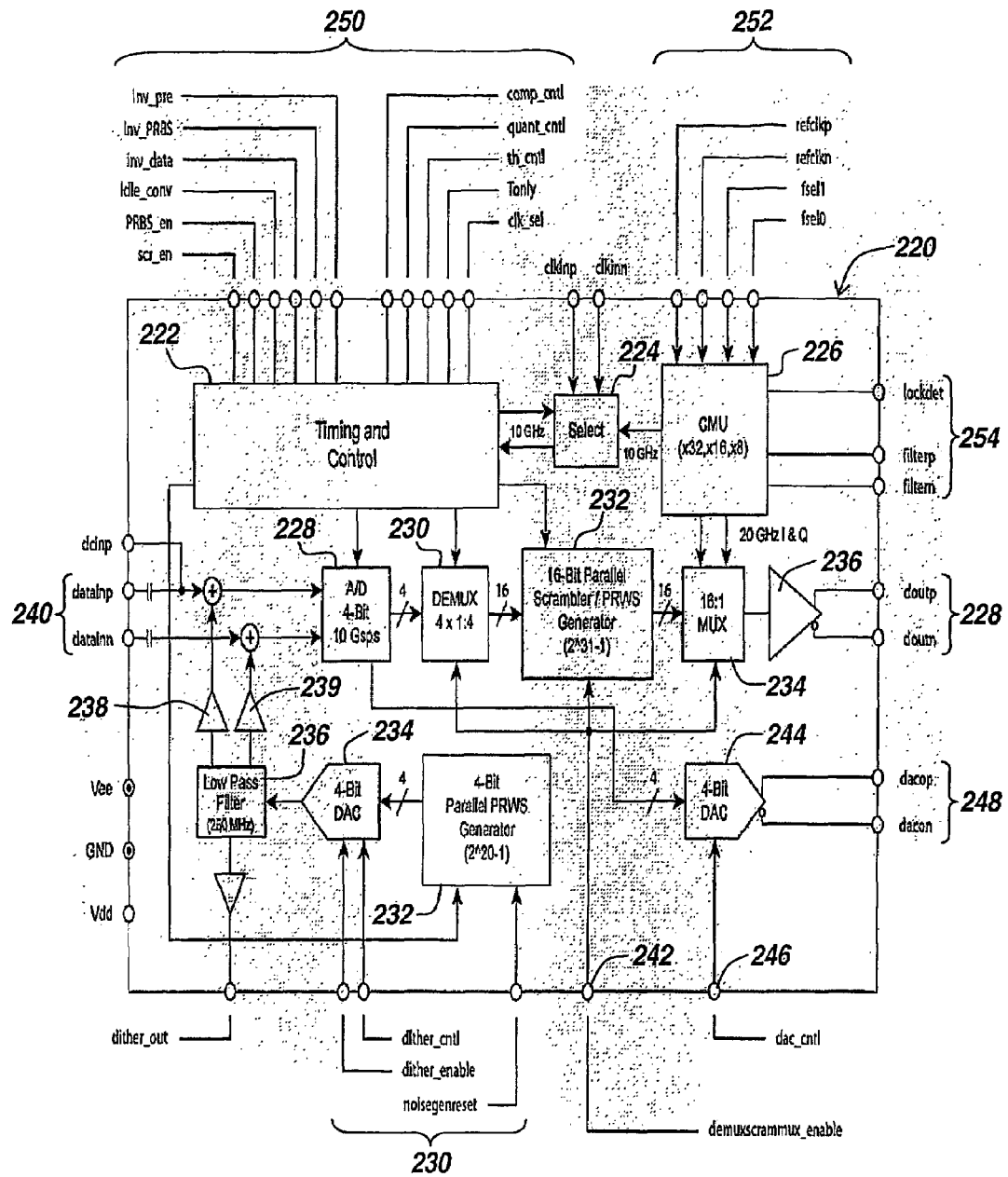
FIG. 14 is a schematic block diagram of a ADC/Serializer of the present invention.

The 4-Bit 10-Gsps flash ADC was fabricated in IBM 7HP SiGe technology. The ADC shows 45 dB of Spurious Free Dynamic Range. Digital output of the converter is multiplexed up into a single 40 Gbps stream. Internal dithering allows for improved spur performance. The converter uses a new wideband Track/Hold circuit and incorporates a novel layout in the quantizer section for speed improvement. FIG. 14 shows the top-level block diagram of the ADC/Serializer.

As can be seen in FIG. 14, the ADC/Serializer, here illustrated at 220, includes a timing control circuit 222, a clock select circuit 224, a clock multiplier unit 226 (CMU), all of which are used in controlling an A/D 4-bit analog-to-digital converter 228 coupled to a demultiplexer 230, in turn coupled to a 16-bit parallel scrambler/pseudo-random write sequencer 232, in turn coupled to a 16:1 multiplexing circuit 234. The output of multiplexing circuit 234 is amplified at 236 to provide a 40-GHz serial bit stream of data at outputs 228.

At the bottom of this figure, additional control signals come in at connectors 230, which are applied respectively to a parallel pseudo-random write sequence generator 232 coupled to a 4-bit digital-to-analog converter 234, in turn coupled to a low pass filter 236 having its outputs amplified at 238 and added to the inputs 240 to analog-to-digital converter 228.

Note that what constitutes the input signal at 240 is the conditioned RF signal from the variable gain amplifier/mixer described in FIG. 12.

Note also that a control signal on terminal 242 is used to enable the digital output on the serial data link 228. Moreover, a 4-bit digital-to-analog converter 244 is coupled to the output of analog-to-digital converter 228 controlled by a signal at 246, with the output of digital-to-analog converter 244 constituting a digital reproduction of the input signal that can then be used as an output transponder response. This output is available at 248.

It will be appreciated that the inputs at 250 to timing-and-control unit 222 are detail controls for the RF conversion and data formats that will be used within the circuits, in addition to threshold control signals for determining response levels.

Also note that inputs 252 to CMU 226 are used for inputting a reference clock signal for the internal clock generating function of the system as well as the specific controls for the particular frequency of the sample clock that will be generated.

It will also be noted that outputs 254 constitute test outputs to verify that the internal clock generator function is working properly.

In operation, a dither generation circuit adds a controllable lowpass dither to the input of the ADC. This dither helps reduce spurs in the frequency band of interest.

The dither generation circuit consists of a 4-bit pseudo-random write sequence generator, a 4-bit digital-to-analog converter and a lowpass filter.

After the encoding section the 4-Bit binary code with data rate of 10 Gbps is fed to a demultiplexer. This demultiplexer reduces the data rate down to 2.5 Gbps suitable for the scrambler section. The output of the scrambler section drives a 16:1 multiplexer. This multiplexer uses a quadrature 20 GHz clock to generate a full 40 Gbps data output. The 20 GHz clock is generated by an internal clock management unit (CMU), which accepts an external reference frequency of 625 MHz. The main challenge in the final multiplexer/driver is the quality of the eye diagram and a good output return loss. These issues have been addressed by various circuit and layout techniques. The output 40 Gbps stream has ~200 fsec rms jitter and ~800 mVpp differential swing. An on chip DAC is included to aid in characterizing the ADC performance.

Figure 15:
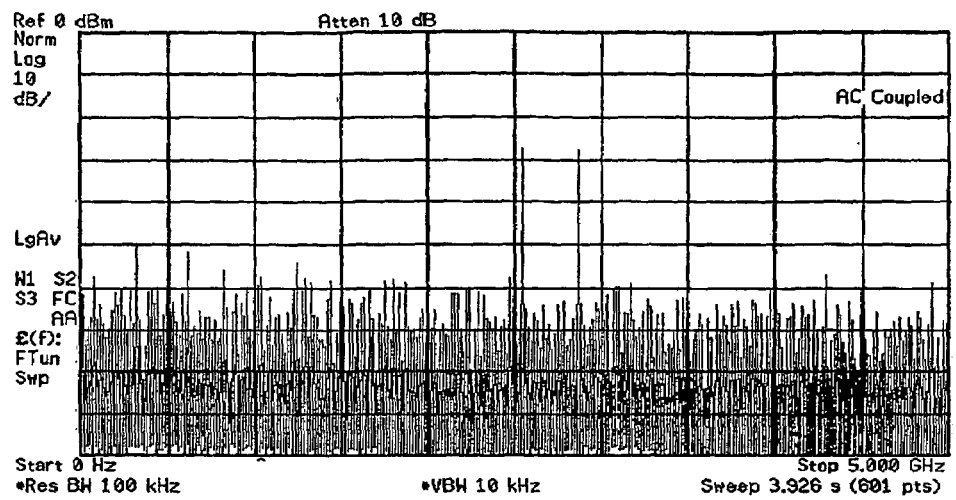
FIG. 15 consists of graphs showing the results of two tone input test with and without dither.
Figure 15:
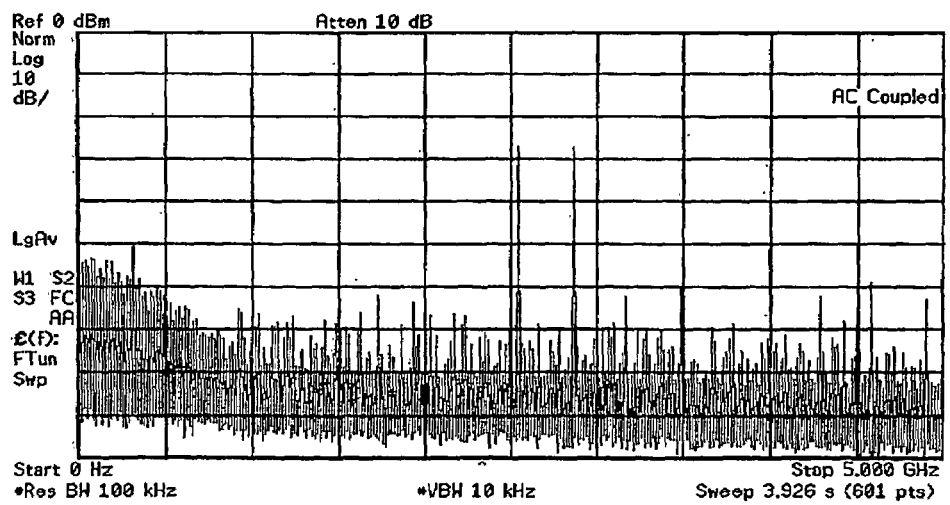

FIG. 15 shows the spectrum of the DAC output with and without dithering. Reduction of spurs is noticeable as a result of the dithering. The remaining spurs mainly are due to the limited Spur-Free Dynamic Range (SFDR) of the DAC. Note, the ADC performance can be improved to 6 bits with 60 dB of dynamic range.

3. Ultra Wideband ADC

A potential architecture enhancement to the subject receiver-on-a-chip includes the addition of a parallel receive path which monitors a very wide bandwidth so as to maximize the probability of intercept of high priority threats. A 3-Bit 20-Gsps ADC is the critical component of the design providing up to 8 GHz of observable bandwidth. This part achieves Spur-Free Dynamic Range of 22 dB in the first Nyquist zone and SFDR of 16 dB in the second Nyquist zone. The converter uses a new wideband Track/Hold circuit and incorporates a novel layout in the quantizer section for speed improvement. Power consumption of the ADC core is ~0.6 W and total power consumption of the chip including the 50 Ohms CML drivers is ~3 W. The IBM SiGe 8T process was used. Note that it is possible to increase the speed of this ADC to over 40 GSPs.

Figure 16:
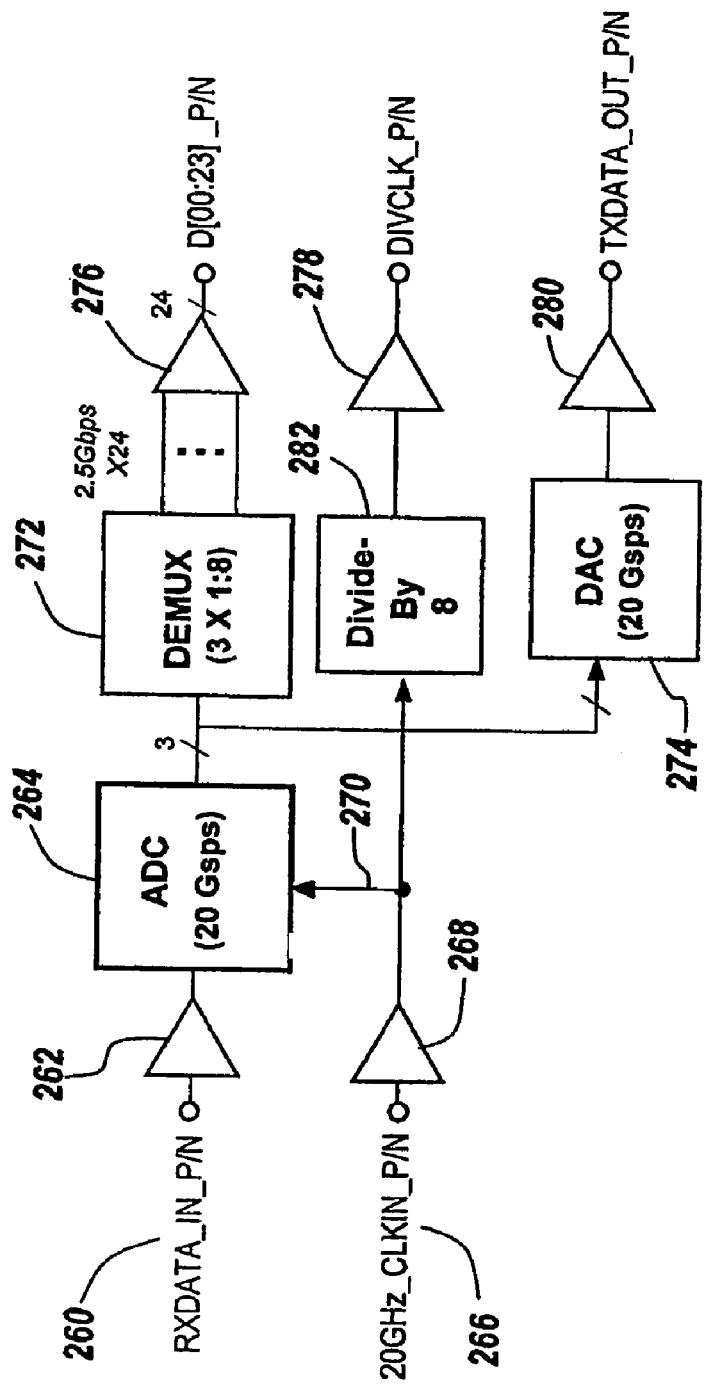
FIG. 16 is a schematic diagram showing a 20 GPS's 3 bit ADC/DAC.

FIG. 16 shows a top-level block diagram of the ADC/DAC. As can be seen in FIG. 16, the ADC/DAC includes a data input 260 coupled through an amplifier 262 to an analog-to-digital converter 264 clocked by a 20-GHz clocking signal 266 amplified at 268 and applied to analog-to-digital converter 264 on line 270.

The output of analog-to-digital converter 264 is applied to a demultiplexing circuit 272 and also to a digital-to-analog converter 274.

Buffers 276, 278 and 280 are respectively coupled to the outputs of demultiplexer 272, a divide-by-eight circuit 282 and a digital-to-analog converter 274 to provide a digital data stream with clocking, at least insofar as the outputs of buffers 276 and 278. The output of buffer 280 constitutes an analog RF output used for a transmit jamming waveform.

In operation, the differential input is fed to an input buffer that drives the analog-to-digital converter section. The analog-to-digital converter consists of Track/Hold circuit, quantizer section, bubble-correction circuitry and binary encoding. One of the critical sections of a high-speed analog-to-digital converter is the Track/Hold (T/H) section. In this design a T/H circuit with over 65 dB SFDR is implemented. The T/H uses two sets of current switches: "Main" current switches function as in conventional track-and-hold circuits. Additional "helping" current switches allow optimization of switching speed while providing proper reverse biasing during the hold mode time.

After the encoding section the 3-Bit binary code with data rate of 20 Gbps feeds two sections: first the Internal DAC and second the Demultiplexer. Using a high-speed DAC to convert the digital data to analog waveform is a very convenient way of testing and characterizing the key features of the ADC. For 3-Bit operation, the DAC linearity and speed are good enough not to degrade the observed ADC performance.

Figure 17:
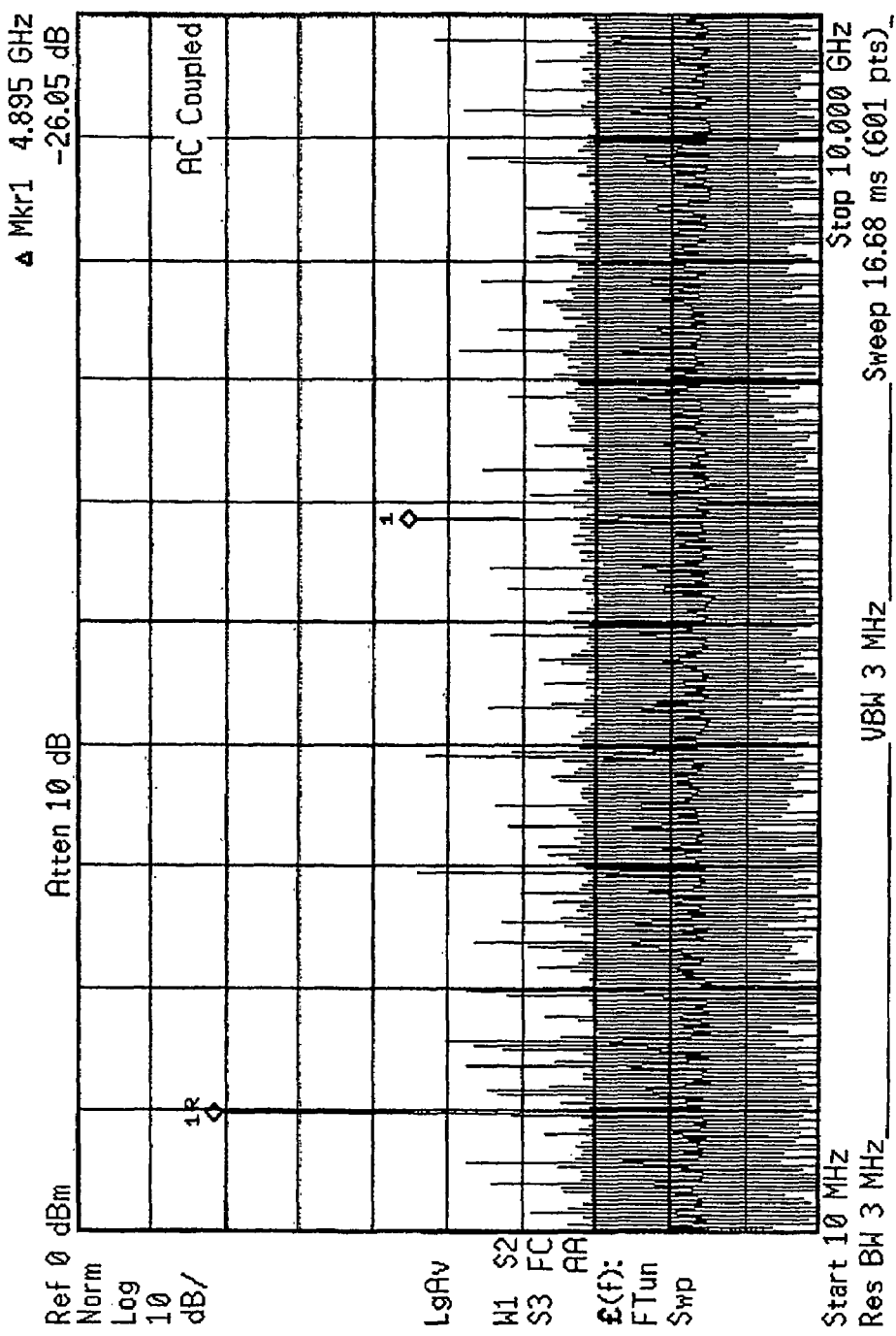
FIG. 17 is a graph showing a 9.17 GHz tone sampled at 20 Gsps Max spur −26 dB.

FIG. 17 shows the measured spectrum of a second Nyquist zone input (19.02 GHz). As can be seen, a spur-free dynamic range of 26 dB is measured. This is in very close agreement with the simulations. This performance makes direct sampling of RF signals as high as 20 GHz a viable solution.

The Demultiplexer section is utilized to reduce the data rate of the 3-Bit binary code from 20 Gbps to 2.5 Gbps. This requires demultiplexing by a factor of 8, resulting in 24 lines of data at 2.5 Gbps. A synchronous clock at 2.5 GHz is also provided to facilitate external data acquisition.

Throughout the design special attention has been paid to the timing between different blocks. To reduce aperture jitter, buffers and gain blocks are included in the clock section to make the clock as square as possible. The power supply for the output drivers is chosen to be 1.8 v to facilitate easy interface with CMOS chips.

Those skilled in the art will appreciate that a novel way to architect new Electronic Warfare systems has been described. An LNA, VGA, and an integrated ADC/Serializer are combined and all worked to the program specifications. The IBM SiGe BiCMOS process provides high RF performance using HBTs along with high levels of digital integration using CMOS. This is essential for wideband circuits where transferring signals from chip to chip is costly in terms of power and I/O and reliability.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A flexible multi-function broadband receiver system for use in electronic warfare on vehicles having weight, size and power consumption limitations, comprising a receiver-on-a-chip having components monolithically formed on a substrate to provide a single integrated circuit chip for performing broadband signal detection using high speed analog-to-digital converters, at least one down-conversion circuit, a digital automatic gain control circuit, a digital signal processor for defining receiver function and a serializer all located on the single chip, whereby modularization is avoided and wherein size and power consumption are minimized, the transistors in a circuit thereto include silicon germanium transistors having switching speeds exceeding 100 GHz, thus to provide for said high speed analog-to-digital converters and reducing the number of IF down-conversion stages.

2. The system of claim 1, and further including an array of antenna elements, one of said receivers located and coupled to a respective antenna element such that said receivers are located at the antenna elements.

3. The system of claim 2, wherein each of said receivers includes a fiber optic output, and further including a unit for processing the outputs of said receivers and fiber optic cables coupling said receiver to said unit, thereby to eliminate the necessity of providing coaxial cable between an antenna element and a follow-on processing unit.

4. The system of claim 1, wherein the circuits of said receiver-on-a-chip are direct coupled, thus eliminating the requirement for drivers and buffers between the circuit elements of said receiver, thus to markedly reduce power consumption.

5. The system of claim 1, wherein said receiver-on-a-chip occupies no more than seven cubic inches.

6. The system of claim 1, wherein the operating frequency of said receiver is between 0.039 GHz and 18 GHz.

7. The system of claim 1, wherein the instantaneous bandwidth of said receiver is in excess of 2000 MHz.

8. The system of claim 1, wherein the weight of said receiver is less than one pound.

9. The system of claim 1, wherein the mean time before failure of said receiver exceeds 10,000 hours.

10. An electronic warfare receiver system light and small enough to be located on an unmanned aerial vehicle, and having a power consumption minimized to maximize endurance, comprising:
    an array of antenna elements on said unmanned aerial vehicle;
    a lightweight monolithic receiver-on-a-chip receiver located at each antenna element;
    fiber optic cables coupled at one end to the output of respective receivers; and,
    a processor coupled to the other ends of said fiber optic cables for processing the individual outputs of said receivers-on-a-chip; and wherein there are no I/O drivers between a circuits on said receiver-on-a-chip, whereby the power consumption of said receiver-on-a-chip receiver is made less than 10 watts.

11. The system of claim 10, wherein each of said receiver-on-a-chip receivers has a volume of less than 7 cubic inches.

12. The system of claim 10, wherein each of said receiver-on-a-chip receivers weighs less than a pound.

13. A broadband receiver-on-a-chip receiver manufactured in a monolithic process using silicon-germanium transistor technology so as to produce transistor switching speeds in excess of 100 GHz to effectuate a 0.03 GHz to 18 GHz operational bandwidth.

14. The receiver of claim 13, wherein said receiver-on-a-chip includes super high-speed analog-to-digital converters running at over 100 GHz to reduce the requirement for numbers of IF stages including down-converters and local oscillators.

15. A flexible multi-function broadband receiver system for use in electronic warfare on vehicles having weight, size and power consumption limitations, comprising:
    A receiver-on-a-chip having components monolithically formed on a substrate to provide a single integrated circuit chip for performing broadband signal detection using high speed analog-to-digital converters, at least one down-conversion circuit, a digital automatic gain control circuit, a digital signal processor for defining receiver function and a serializer all located on the single chip, whereby modularization is avoided and wherein size and power consumption are minimized, wherein the transistors in a circuit thereto include silicon germanium transistors having switching speeds exceeding 100 GHz, thus to provide for said high speed analog-to-digital converters and reducing the number of iF down-conversion stages; and further including an array of antenna elements, a receiver-on-a-chip located and coupled to a respective antenna.

16. The system of claim 15, wherein each of said receivers includes a fiber optic output, and further including a unit for processing the outputs of said receivers-on-a-chip and fiber optic cables coupling said receiver to said unit, thereby to eliminate the necessity of providing coaxial cable between an antenna element and a follow-on processing unit.

17. The system of claim 15, wherein the circuits of said receiver-on-a-chip are direct coupled, thus eliminating the requirement for drivers and buffers between the circuit elements of said receiver, thus to markedly reduce power consumption.

18. The system of claim 15, wherein said receiver-on-a-chip occupies no more than seven cubic inches.

* * * * *